(12) United States Patent
Alexander

(10) Patent No.: US 7,298,803 B2
(45) Date of Patent: Nov. 20, 2007

(54) METHODS AND APPARATUSES FOR FILTERING COMMON MODE INTERFERENCE

(75) Inventor: William C. Alexander, Spicewood, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 722 days.

(21) Appl. No.: 10/627,961

(22) Filed: Jul. 25, 2003

(65) Prior Publication Data

US 2004/0156457 A1 Aug. 12, 2004

Related U.S. Application Data

(60) Provisional application No. 60/437,171, filed on Dec. 30, 2002.

(51) Int. Cl.
*H04L 1/00* (2006.01)

(52) U.S. Cl. .................. 375/346; 375/148; 375/350; 375/349; 375/347; 375/285; 455/296; 455/278.1; 455/283; 455/307; 327/309

(58) Field of Classification Search ............... 375/148, 375/346, 350, 349, 260, 267, 347, 340, 285; 455/296, 63.1, 278.1, 283, 307, 295, 298; 327/309; 398/38
See application file for complete search history.

(56) References Cited

U.S. PATENT DOCUMENTS

| 5,920,223 | A | * | 7/1999 | Johnson | 327/309 |
| 6,575,915 | B2 | * | 6/2003 | Nissila et al. | 600/500 |
| 2002/0159427 | A1 | * | 10/2002 | Cleveland | 370/342 |
| 2004/0047461 | A1 | * | 3/2004 | Weisman et al. | 379/202.01 |

* cited by examiner

*Primary Examiner*—Chieh M. Fan
*Assistant Examiner*—Siu M Lee
(74) *Attorney, Agent, or Firm*—Fulbright & Jaworski LLP; Daniel J. Long

(57) ABSTRACT

In one embodiment, a method that includes detecting a level on each of a plurality of data channels; summing the levels of a subset of data channels to get a summed level, the subset of data channels containing the lowest levels present in the plurality of data channels; comparing the summed level with the highest level present in the plurality of data channels; and rejecting a common mode interference in each of the plurality of data channels if the summed level exceeds the highest level present in the plurality of data channels. In another embodiment, an apparatus that includes a plurality of data channels; an array of input filters coupled to the plurality of data channels; a pulse detection circuit coupled to the array of input filters; a common mode rejection circuit coupled to the pulse detection circuit; and a pulse data queuing and transmission circuit coupled to the common mode rejection circuit. Other methods and apparatuses are disclosed.

10 Claims, 4 Drawing Sheets

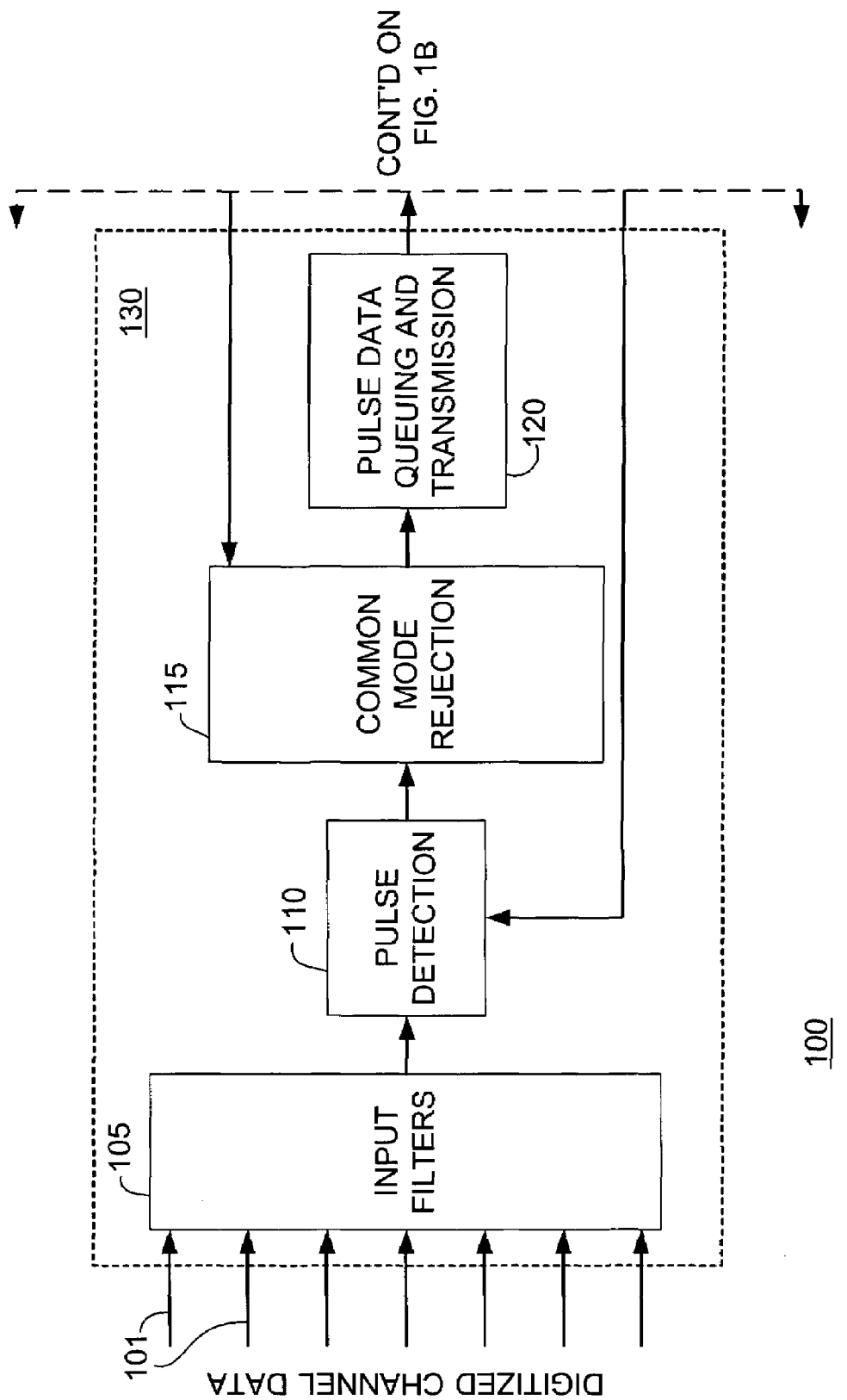

METHODS AND APPARATUSES FOR FILTERING COMMON MODE INTERFERENCE

CROSS-REFERENCE(S) TO RELATED APPLICATION(S)

This application claims priority to U.S. Provisional Patent Application Ser. No. 60/437,171, filed Dec. 30, 2002, the entire contents of which are expressly incorporated by reference.

REFERENCE TO APPENDIX

This application includes a computer program listing appendix, submitted on compact disc (CD). The content of the CD is incorporated by reference in its entirety and accordingly forms a part of this specification. The CD contains the following file:

File name: full7function.txt
File Size: 35.1 kb
Creation date for CD: Jun. 25, 2003

BACKGROUND OF THE INVENTION

The portion of this disclosure contained on CD of this patent document contains material that is subject to copyright protection. The copyright owner has no objection to the facsimile reproduction by anyone of the patent document or the patent disclosure on the CD, as it appears in the Patent and Trademark Office patent files or records, but otherwise reserves all copyright rights whatsoever.

1. Field of the Invention

The invention relates generally to the field of signal processing. More particularly, the invention relates to a method and apparatus for filtering common mode interference.

2. Discussion of the Related Art

Typically, multi-channel navigation systems include an array of sensors (or transducers) and signal conditioning elements for detecting analog signals and generating digital data for further processing by a guidance processor. The guidance processor can determine the position of a signal source based on the received information while using parameters characteristic of the array. A multi-channel navigation system may be, for example, a multi-channel laser seeker.

A multi-channel laser seeker receives laser pulses on a few of its multiple channels, and uses this data to determine the direction or position of a laser source. In practice, the seeker receives data only on a small subset of its channels for any given laser pulse, while the other channels are near zero on their response.

Unfortunately, multi-channel laser seekers may be subject to electrical interference that may appear as large signals on most or all channels simultaneously. The electrical interference may be in the form of pulses and, when the average pulse repetition frequencies (PRF) is high, it may severely degrade the seeker's performance.

SUMMARY OF THE INVENTION

In one embodiment, the invention is a method that includes detecting a level on each of a plurality of data channels; summing the levels of a subset of data channels to get a summed level, the subset of data channels containing the lowest levels present in the plurality of data channels; comparing the summed level with the highest level present in the plurality of data channels; and rejecting a common mode interference in each of the plurality of data channels if the summed level exceeds the highest level present in the plurality of data channels. Other embodiments of the present methods are described below.

In another embodiment, the invention is an apparatus that includes a plurality of data channels; an array of input filters coupled to the plurality of data channels; a pulse detection circuit coupled to the array of input filters; a common mode rejection circuit coupled to the pulse detection circuit, the common mode rejection circuit operable to sum the levels of a subset of data channels to get a summed level, the subset of data channels containing the lowest levels present in the plurality of data channels, compare the summed level with the highest level present in the plurality of data channels, and reject a common mode interference in each of the plurality of data channels if the summed level exceeds the highest level present in the plurality of data channels; and a pulse data queuing and transmission circuit coupled to the common mode rejection circuit. Other embodiments of the present apparatuses are described below.

BRIEF DESCRIPTION OF THE DRAWINGS

The following drawings demonstrate aspects of the present methods and apparatuses. They illustrate by way of example and not limitation. Like reference numbers refer to similar elements. The features illustrated in the drawings are not necessarily drawn to scale.

FIGS. 1A-B show a block diagram of one embodiment of a common mode interference processing system suitable for use with the present method and apparatuses.

DETAILED DESCRIPTION

Figure 1B:
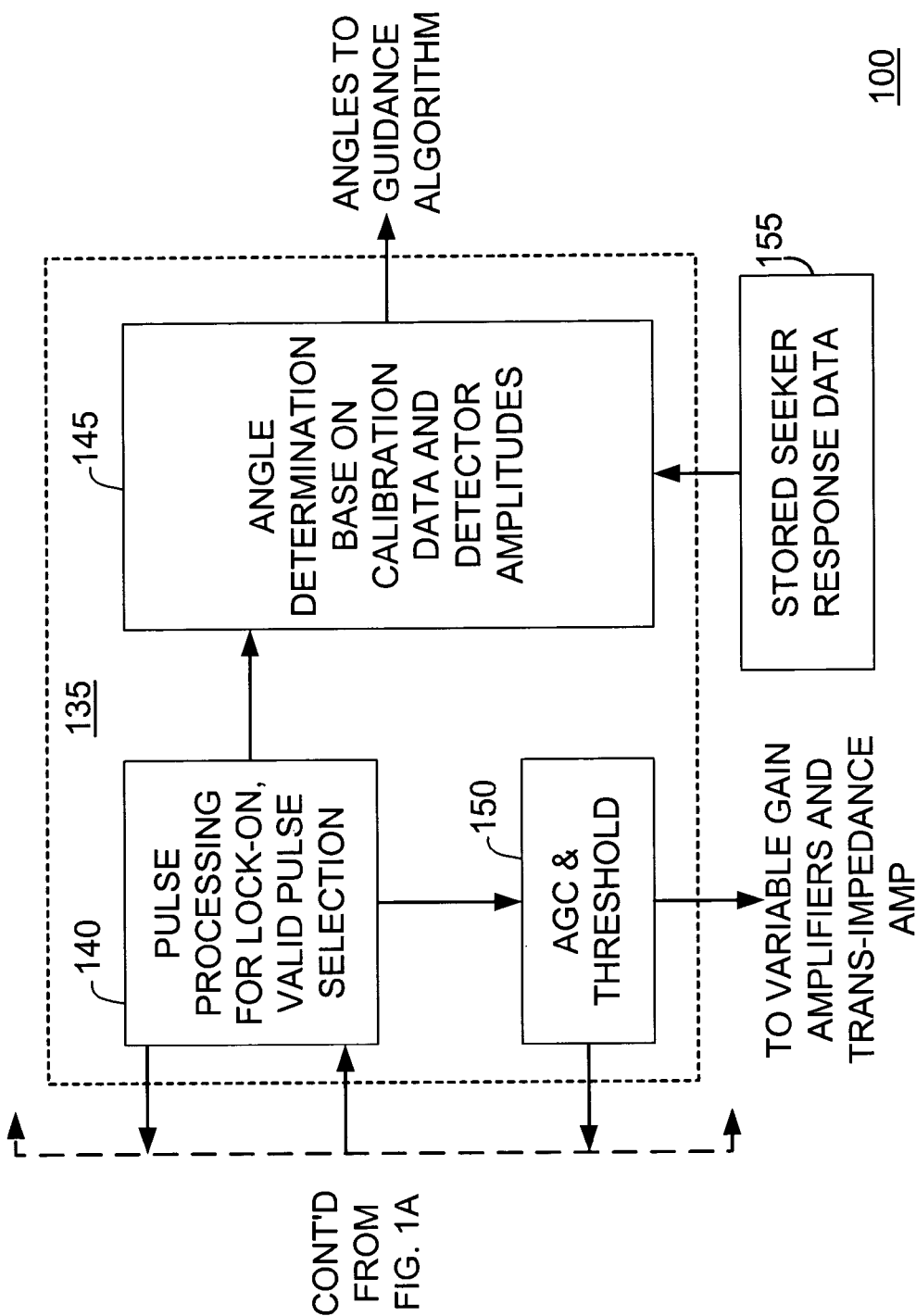

In this document (including the claims), the terms "comprise" (and any form of comprise, such as "comprises" and "comprising"), "have" (and any form of have, such as "has" and "having"), and "include" (and any form of include, such as "includes" and "including") are open-ended linking verbs. For example, a method "comprising" detecting a level on each of a plurality of data channels; summing the levels of a subset of data channels to get a summed level; comparing the summed level with the highest level present in the plurality of data channels; and rejecting a common mode interference in each of the plurality of data channels if the summed level exceeds the highest level present in the plurality of data channels is a method that possesses at least these steps, but is not limited to possessing only these steps.

Similarly, an apparatus "comprising" a plurality of data channels; an array of input filters coupled to the plurality of data channels; a pulse detection circuit coupled to the array of input filters; a common mode rejection circuit coupled to the pulse detection circuit; and a pulse data queuing and transmission circuit coupled to the common mode rejection circuit is an apparatus that possesses at least these structures, but is not limited to possessing only these structures. For example, this apparatus also covers an apparatus that possesses a guidance circuit coupled to the pulse data queuing and transmission circuit.

The terms "a" and "an" are defined as one or more than one. The term "another" is defined as at least a second or more. The term "plurality" is defined as two or more than two. The term "coupled" is defined as connected, although not necessarily directly, and not necessarily mechanically. The term "program" or "computer program" is defined as a sequence of instructions designed for execution on a computer system.

Those of ordinary skill in the art will appreciate that in the detailed description below, certain well known components and assembly techniques have been omitted so that the invention is not obscured in unnecessary detail.

The invention may include a method and apparatus for filtering a common mode interference embedded in a plurality of data streams. In one exemplary embodiment, the invention may include a digital front-end that removes a common mode interference from the plurality of data streams before the data is sent to a pulse processor or a guidance circuit. In another embodiment, the invention may include rejecting a common mode interference in a multi-channel laser seeker to determine the direction or position of a laser source. The laser seeker may have, for example, seven data channels. Such systems may find a variety of applications including, for example, navigation and automated projectile maneuvering.

Typically, a multi-channel laser seeker receives data only on a small subset of its channels for any given laser pulse, while the other channels are near zero on their response. Nevertheless, the seeker may be subject to electrical interference on most or all channels simultaneously. The invention may include identifying and rejecting common mode interference in a plurality of channels with a digital front-end.

Referring to FIGS. 1A-B, a block diagram of one embodiment of a common mode interference processing system 100 is depicted. Plurality of digitized data channels 101 is coupled to array of input filters 105 of digital front-end circuit 130. Array of input filters 105 is coupled to pulse detector circuit 110, and pulse detector circuit 110 is coupled to common mode rejection circuit 115. Common mode rejection circuit 115 is coupled to pulse data queuing and transmission circuit 120, and pulse data queuing and transmission circuit 120 is coupled to pulse processor 140 of guidance circuit 135. Pulse processor 140 is coupled to common mode rejection filter 115, angle determination circuit 145, and automatic gain control and threshold circuit 150. Automatic gain control and threshold circuit 150 is coupled to a variable gain amplifier (not shown) and to pulse detection circuit 110. Angle determination circuit 145 is coupled to a computer (not shown). Storage media 155 is coupled to angle determination circuit 145.

In one exemplary embodiment, each of plurality of digitized data channels 101 may represent an incoming digitized signal from a sensor or a transducer, such as, for example, a photodiode or the like.

In practice, digital front-end circuit 130 may be an integrated circuit or a programmable circuit, such as, for example, a programmable logic device (PLD) or a field-programmable gate array (FPGA). When digital front-end circuit 130 is a programmable circuit, a program, such as that presented below and discussed in detail with reference to FIG. 2, creates an apparatus in accordance with the present invention that operates in accordance with the methods of the present invention. In the alternative, digital front-end circuit 130 may be hard-wired or may use predetermined data tables, or may be a combination of hard-wired and programmable circuitry.

When in operation, a plurality of incoming digitized signals enters digital front-end circuit 130 via array of input filters 106. An input filter may be, for example, high-pass filters to correct for an analog-to-digital conversion effect. Next, the plurality of signals is fed into pulse detection circuit 110, which identifies pulses according to a threshold set by automatic gain control and threshold circuit 150, delivering a plurality of unfiltered data streams to common mode rejection circuit 108. At common mode rejection circuit 108, a common mode interference is filtered out of the data streams, and the data streams are transmitted to guidance circuit 135 via pulse data queuing and transmission circuit 120.

Guidance circuit 135 may be a processor, a digital signal processor (DSP), a computer, or the like. Program storage media 155 may be any type of readable memory including, for example, a magnetic or optical media such as a card, tape or disk, or a semiconductor memory such as a PROM or FLASH memory. In one embodiment, program storage media 155 may include a stored seeker response data.

When in operation, guidance circuit 135 processes streams of pulses and determines the direction of a source by calculating angles based on pulse amplitudes and using a calibration data such as, for example, a seeker's response data stored in storage media 155. The operation of guidance circuit 135 is known to one of ordinary skill in the art and needs not be detailed here.

Figure 2:
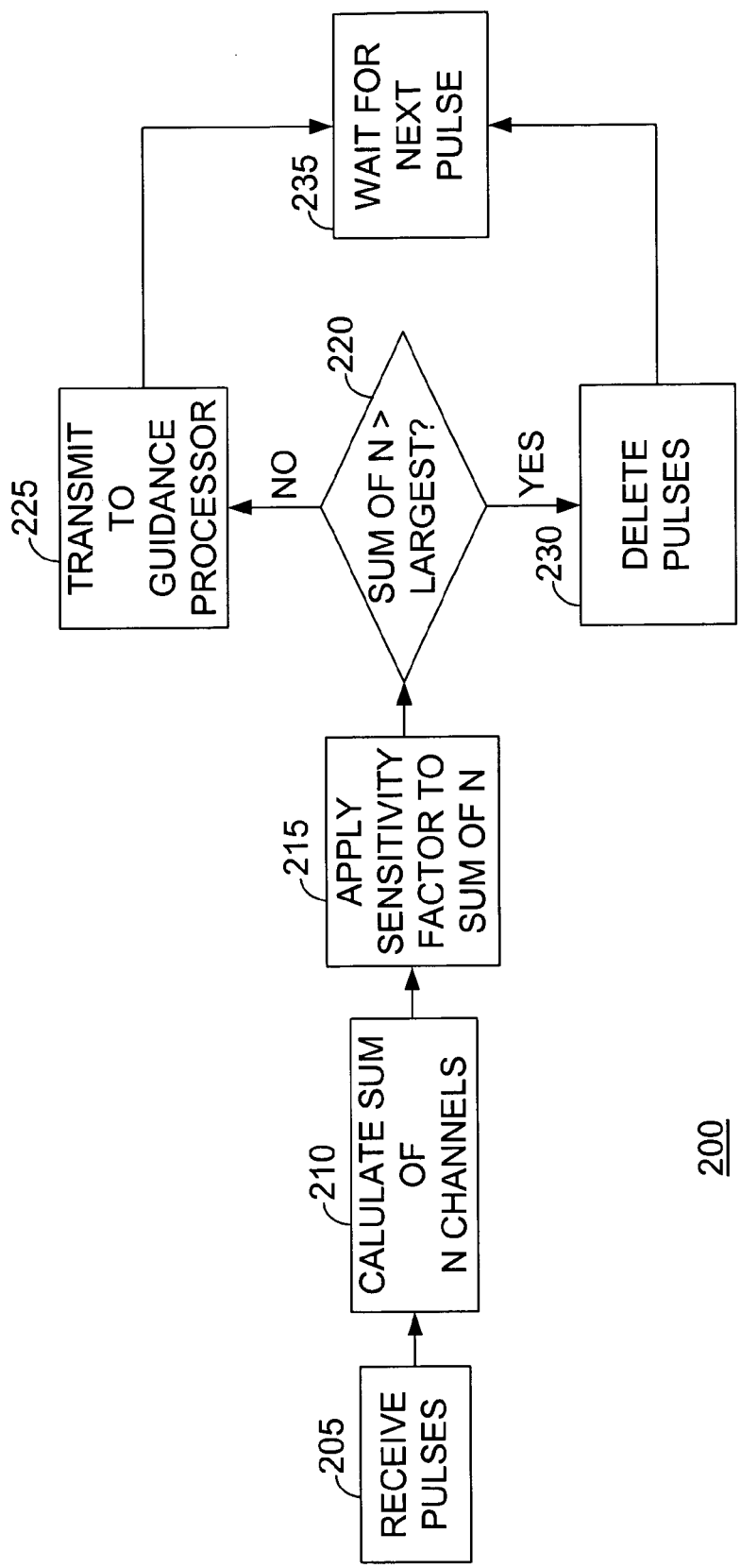
FIG. 2 shows a flowchart of one embodiment of a common mode interference filtering method suitable for use with the present method and apparatuses.

Referring to FIG. 2, a flowchart of one embodiment of a common mode interference filtering method 200 is depicted. Method 200 may be performed by common mode rejection circuit 115 of FIG. 1A. In one embodiment, the method monitors a plurality of data channels for pulses, performs a calculation with a number of channels that have the lowest voltage level, and compares this result with the channel that has the highest level.

In step 205, a pulse is received. In step 210, a subset of N channels with the lowest levels among the plurality of data channels is identified, and these lowest levels are summed into a summed level, where N is an integer. In one embodiment, N is equal to 3—that is, 3 data channels with the 3 lowest levels are summed. In step 215, a sensitivity factor provided by the pulse processor 140 to the common mode rejection circuit 115 is used to multiply the sum of N channels. In one embodiment, the sensitivity factor is set to 1. In another embodiment, the sensitivity factor is equal to 2. In step 220, the summed level is compared to the highest level present among the plurality of data channels. If the sum of lowest N channels if larger than the highest channel level, the pulses on every channel are deleted. Otherwise the channels data is transmitted to guidance circuit 140 detailed in FIG. 1B. Next, control passes to step 235 and the method waits for the next pulse.

In one embodiment, method 200 is repeated several times. In another embodiment, method 200 is repeated at every data point. The invention may include performing method 200 every 10 ηs (100 MHz). The sensitivity factor may be changed by pulse processor 140 as a function of the false alarm rate, that is, the rate at which method 200 deletes actual data instead of filtering only common mode interference.

Software or computer instructions configured to carry out one or more steps of method 200 may be loaded onto a computer readable medium. One of ordinary skill in the art will understand that computer readable medium may take many forms, including any data storage device that can store data that can thereafter be read by a processor, a computer or a computer system, including, for example, a disk, such as a floppy disk, a zip disk, or the like; read-only memory; random access memory; CD-ROMs; magnetic tape; optical data storage devices, SMARTMEDIA® cards; flash memory; compact flash memory; and the like. The computer readable medium can also be distributed over network-coupled computer systems so that the computer readable instructions are stored and executed in a distributed fashion. For example, the computer readable medium may also take the form of a carrier wave such as, for example, signals on a wire (e.g., signals downloaded from the Internet) or those that are transmitted electromagnetically or through infra red means.

Shown in the computer program listing appendix (see CD) is an exemplary source code written in Altera Hardware Description Language that is suitable for carrying out steps described above, and which may be used in conjunction with a field programmable gate array (FPGA) such as, for example, the APEX 20KE FPGA (EP20K200E) from Altera Corporation. The code is an example of how to filter a common mode interference according to the methods detailed in FIG. 2 and described above. This code is exemplary and does not limit the scope of the claims. It simply represents one specific embodiment for carrying out steps associated with the present methods and is included for the convenience of the reader in this regard. Those of ordinary skill in the art having the benefit of this disclosure will recognize that a wide variety of computational techniques and/or different types of corresponding source code may be used in implementing the present methods.

Figure 3:
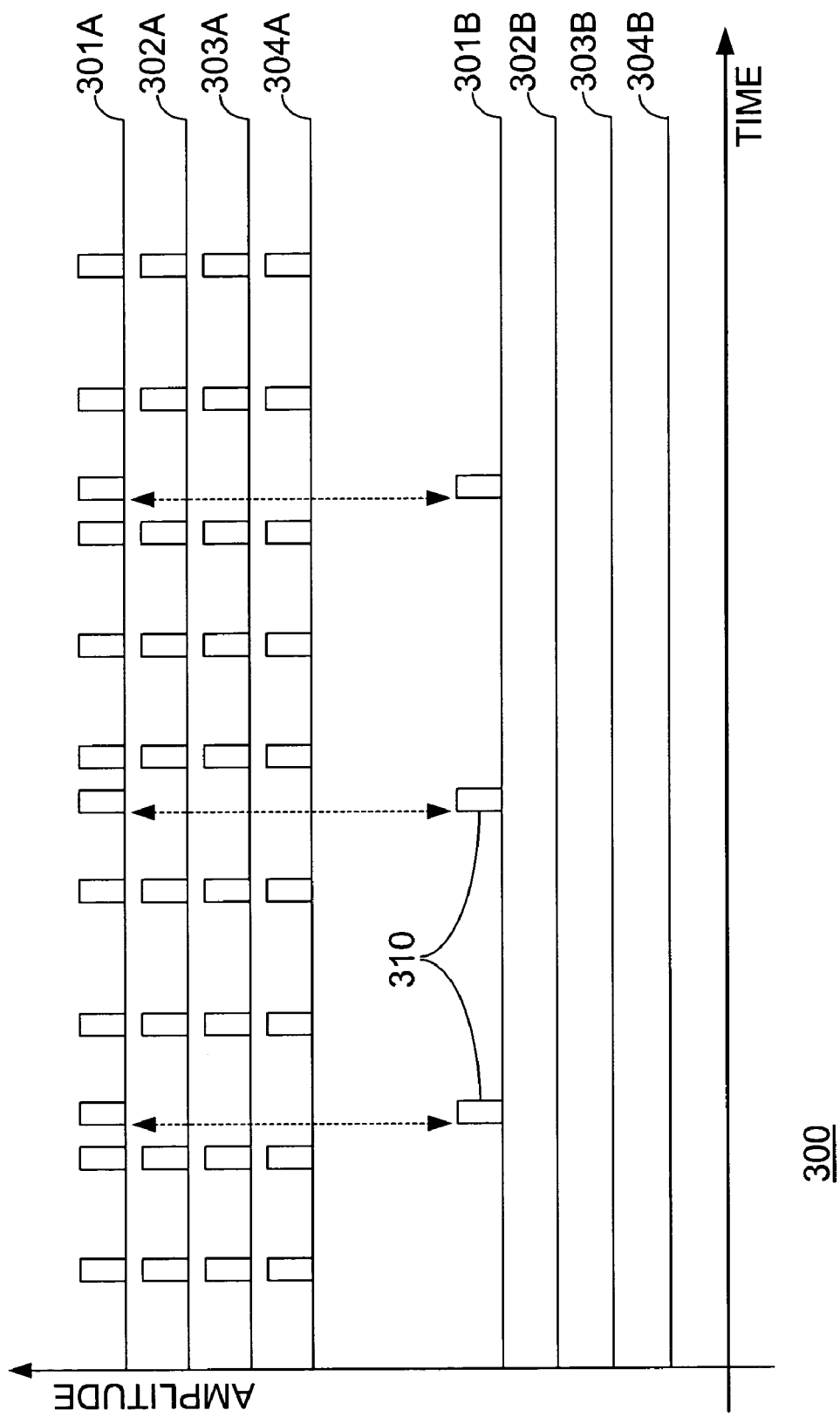
FIG. 3 shows a graph of filtered and unfiltered simulated data streams, illustrating an aspect of the invention.

Referring to FIG. 3, a graph of filtered and unfiltered simulated data streams 400 is depicted illustrating an aspect of the invention. The horizontal axis is time and the vertical axis is the amplitude. Plurality of incoming channels 301A-304A containing common mode interference is processed by common mode rejection circuit 115 of FIG. 1A operating as described above. Resulting filtered data streams 301B-304B contain only data pulses 310 in channel 301B, and are free of the common mode interference originally present in every incoming channel 301A-304A.

The individual components described above need not be made in the exact disclosed forms, or combined in the exact disclosed configurations, but could be provided in any suitable form, and/or combined in any suitable configuration. It will also be clear to those of ordinary skill in the art substitutions, modifications, additions and/or rearrangements of the features of the inventive methods and devices may be made without deviating from their scope, which is defined by the claims and their equivalents. The appended claims are not to be interpreted as including means-plus-function limitations, unless such a limitation is explicitly recited in a given claim using the phrase(s) "means for" and/or "step for," respectively.

I claim:
1. A method comprising:
detecting a level on each of a plurality of data channels;
summing the levels of a subset of data channels to get a summed level, the subset of data channels containing the lowest levels present in the plurality of data channels;
comparing the summed level with the highest level present in the plurality of data channels; and
rejecting a common mode interference in each of the plurality of data channels if the summed level exceeds the highest level present in the plurality of data channels.

2. The method of claim 1, where the detecting includes monitoring every data point of the plurality of data channels.

3. The method of claim 1, where the detecting includes detecting a level on each of seven data channels.

4. The method of claim 1, where the detecting includes detecting a pulse on each of a plurality of data channels.

5. The method of claim 1, where the summing the levels of the subset of data channels includes summing the levels of three data channels.

6. The method of claim 5, where the summing the levels of three data channels includes summing the three lowest levels present in the plurality of data channels.

7. The method of claim 1, further comprising multiplying the summed level by a sensitivity factor.

8. The method of claim 7, further comprising adjusting the sensitivity factor to minimize a false alarm rate.

9. An apparatus comprising:
a plurality of data channels;
an array of input filters coupled to the plurality of data channels;
a pulse detection circuit coupled to the array of input filters;
a common mode rejection circuit coupled to the pulse detection circuit, the common mode rejection circuit operable to:
sum the levels of a subset of data channels to get a summed level, the subset of data channels containing the lowest levels present in the plurality of data channels,
compare the summed level with the highest level present in the plurality of data channels, and
reject a common mode interference in each of the plurality of data channels if the summed level exceeds the highest level present in the plurality of data channels; and
a pulse data queuing and transmission circuit coupled to the common mode rejection circuit.

10. The apparatus of claim 9, further comprising a guidance circuit coupled to the pulse data queuing and transmission circuit.

* * * * *